Figure 5:
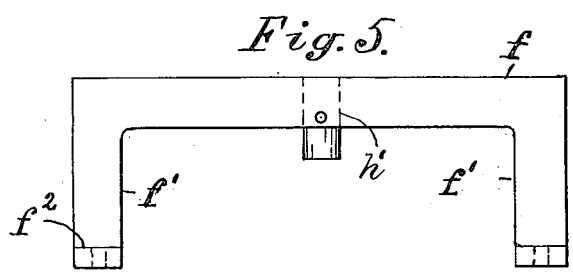

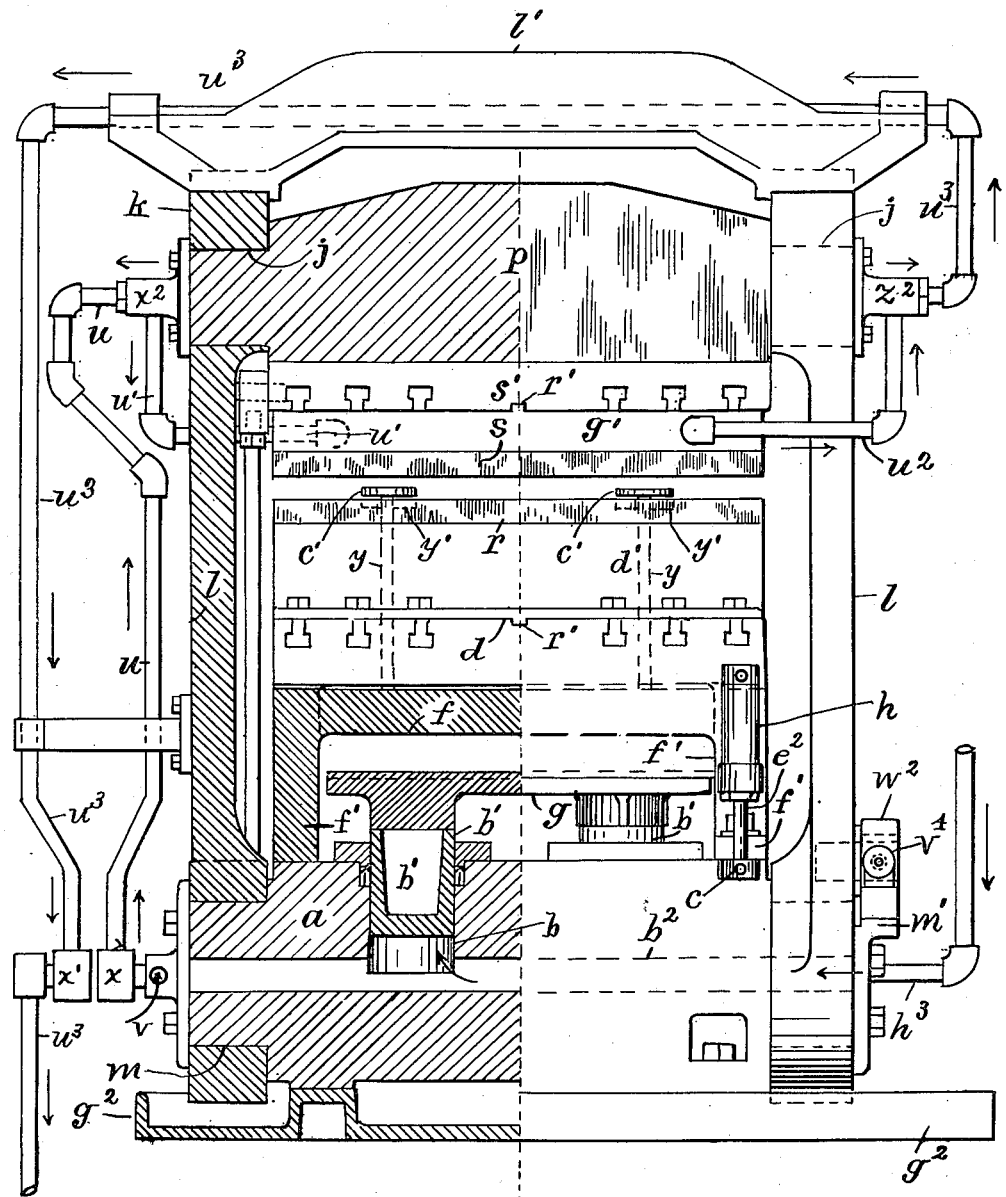

C. F. BURROUGHS.
MOLDING PRESS.
APPLICATION FILED JAN. 15, 1920. RENEWED MAR. 2, 1921.
1,405,484.
Patented Feb. 7, 1922.
4 SHEETS—SHEET 2.
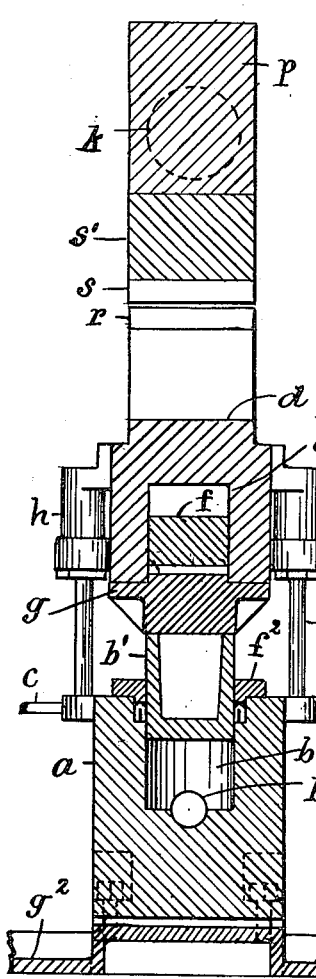
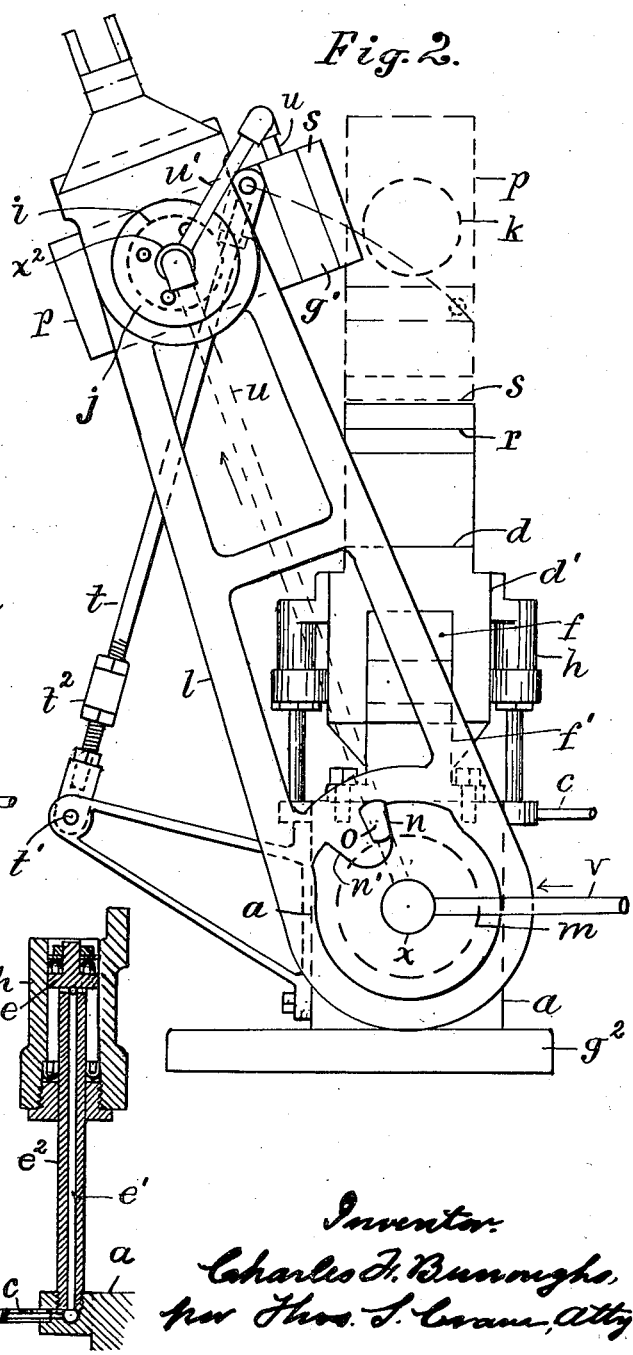

C. F. BURROUGHS.
MOLDING PRESS.
APPLICATION FILED JAN. 15, 1920. RENEWED MAR. 2, 1921.

1,405,484.

Patented Feb. 7, 1922.
4 SHEETS—SHEET 3.

Inventor.
Charles F. Burroughs,
per Thos. S. Crane, Atty.

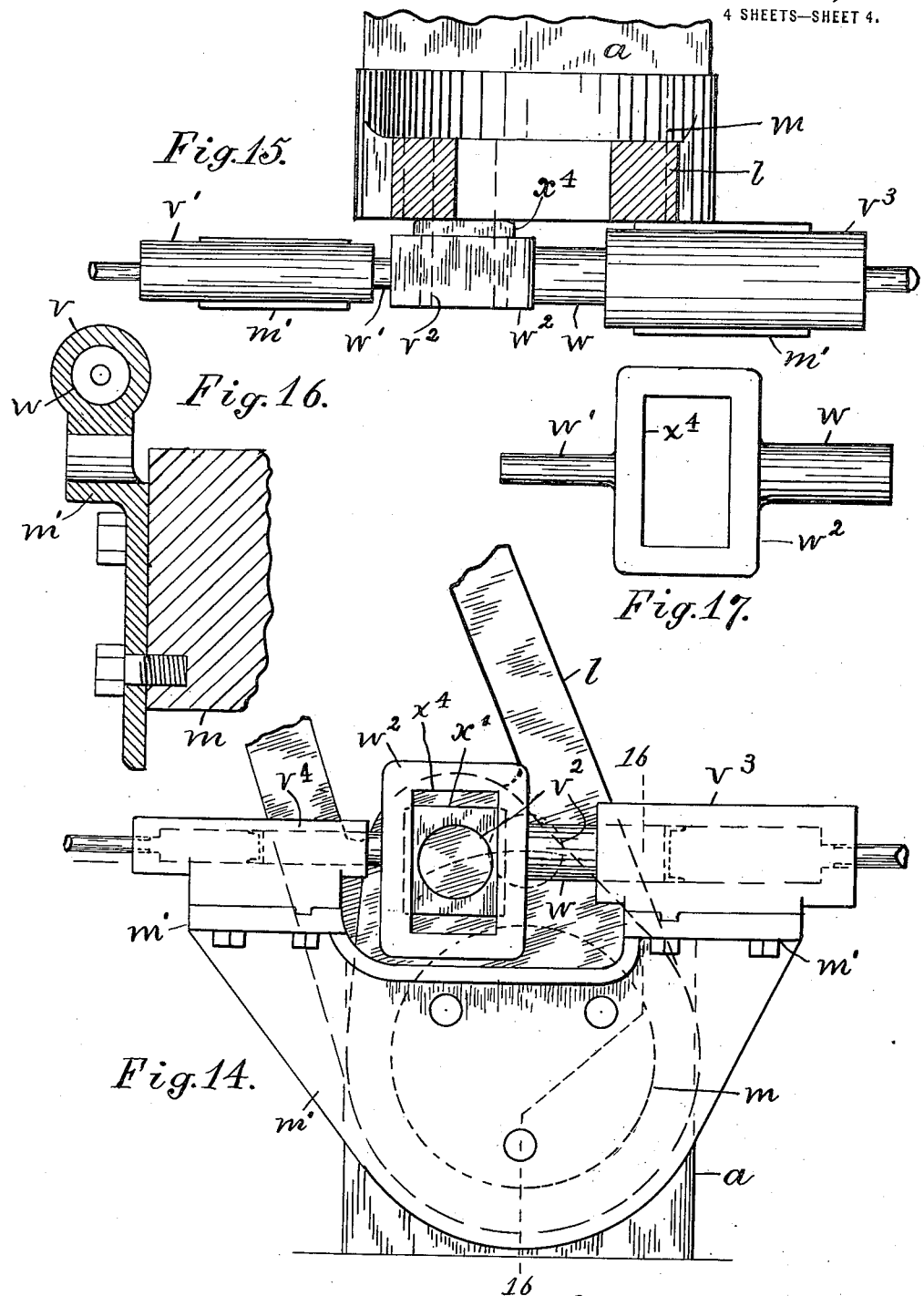

UNITED STATES PATENT OFFICE.

CHARLES F. BURROUGHS, OF EAST ORANGE, NEW JERSEY, ASSIGNOR TO COMPOSITION MACHINERY CORPORATION, OF NEWARK, NEW JERSEY, A CORPORATION OF NEW JERSEY.

MOLDING PRESS.

1,405,484.      Specification of Letters Patent.      Patented Feb. 7, 1922.

Application filed January 15, 1920, Serial No. 351,095. Renewed March 2, 1921. Serial No. 449,085.

*To all whom it may concern:*

Be it known that I, CHARLES F. BURROUGHS, a citizen of the United States, residing at 122 Prospect Street, East Orange, county of Essex, and State of New Jersey, have invented certain new and useful Improvements in Molding Presses, fully described and represented in the following specification and the accompanying drawings, forming a part of the same.

This invention relates to various improvements in molding presses having mold-parts actuated by hydraulic means to mold plastic material into the desired shape.

In molding-presses of such character it is common to attach one mold-part in an inverted position to the head of the press and to move the other mold-part thereto by a platen or table connected with a hydraulic ram.

When the pressure upon the mold has been effected, the movement of the ram is reversed and the mold-parts separated, but as the movement of a hydraulic plunger is relatively slow it is common to separate such mold-parts as short a distance as possible, only sufficient to remove the molded article and insert a fresh charge of material. When such molds are injured or require replacement, the space in which they are moved is not adequate to see and operate upon them readily, and means has therefore been provided to move the mold-parts laterally in relation to one another and also to rotate the head of the press to turn the cope or top of the mold upwardly where it can be readily handled.

In my Patent No. 1,308,475 granted July 1, 1919, for tilting head for molding press, I have claimed such a rotatable head provided with hand-gearing for turning it, but I have invented the present mechanism in which the mold is turned automatically by mechanical agency at the end of each molding operation, so that the operator may, without delay, remove the pressed article from the mold and supply the mold with fresh material.

By the present invention the mold is opened and its cope inverted without any attention on the part of the operator and during the time that the mold-parts are being separated.

The mold-carrier shown in the drawing and the rotating head for carrying the cope are both represented of oblong shape; but the invention may be applied to mold-carriers and rotatable heads of any suitable form to operate with any required molds.

The improvements are applicable to a press having the mold-carrier moved by one or more press-rams, two of such rams being shown herein, arranged to operate the same mold-carrier.

Figure 6:
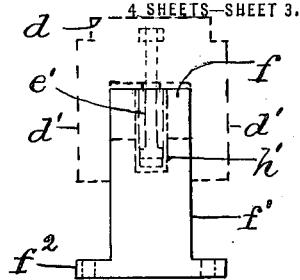
Figure 7:
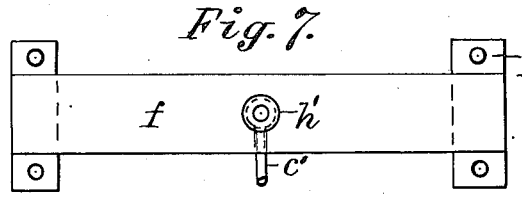
Figure 8:
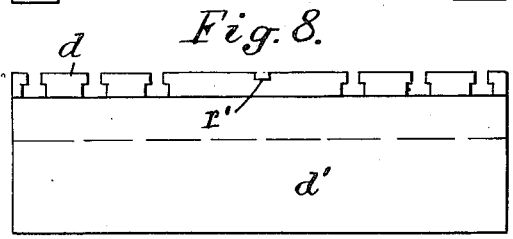
Figure 9:
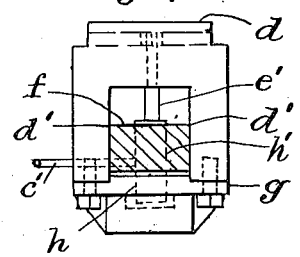
Figure 10:
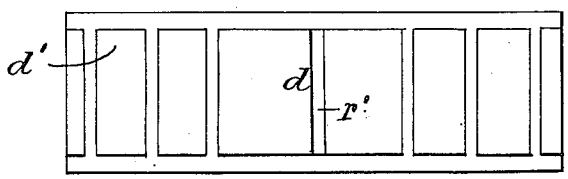
Figure 11:
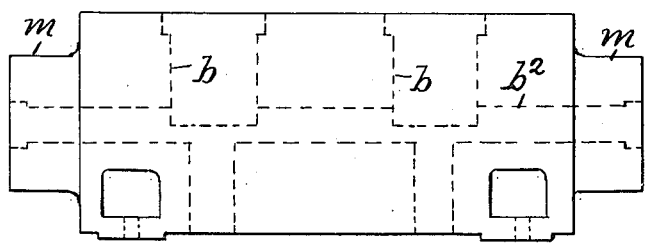
Figure 12:
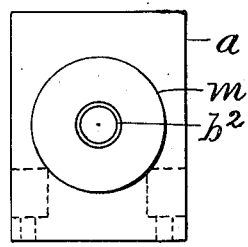
Figure 13:
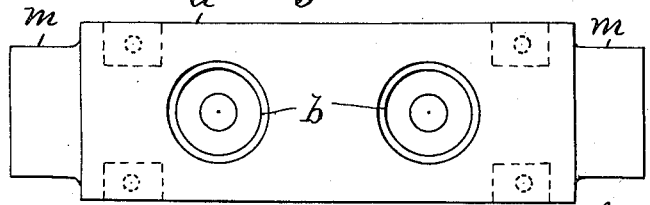

These improvements, as well as others described herein, will be understood by reference to the annexed drawing, in which Fig. 1 is a front elevation of a molding press containing the improvements, the parts in the left-half of the figure being in section on the center line of the press-ram. Fig. 2 is a side view of the press, with dotted lines showing the head in the working position of the mold-parts; Fig. 3 is a vertical section of the press at the center of one of the press-rams; Fig. 4 is a section of cylinder $h$; Fig. 5 is a side elevation of the mold carrier guide; Fig. 6 is an end elevation of the guide with dotted lines showing the mold-carrier thereon; Fig. 7 is a plan of the guide; Fig. 8 is a side elevation of the body of the mold-carrier; Fig. 9 is an end view of the same; Fig. 10 is a plan of the same; Fig. 11 is a side elevation of the base of the press; Fig. 12 is an end elevation of the base; Fig. 13 is a plan of the base; Fig. 14 is a side elevation of hydraulic means to operate the arms of the tilting-head; Fig. 15 is a plan of the same with arms broken off; Fig. 16 is an end elevation of the cylinder-support; and Fig. 17 is a side view of the rams for the cylinders.

The base $a$ of the press is shown as a casting of square cross section in Figs. 3 and 11, with two vertical cylinders $b$ formed therein, and provided with upwardly movable rams $b'$.

The base is mounted in a pan $g^2$. The hydraulic pressing fluid is supplied to the cylinders $b$ through a passage $b^2$ in the base, and a pipe $h^3$, which in practice is connected to an accumulator by a suitable valve. Such valve also has a passage to discharge the fluid from the cylinders $b$. This valve may be actuated by hand for each operation of the press, or may be automatically opened and closed by connection to some moving part of the press, as shown in my prior Patent No. 1,308,475 of July 1, 1919.

The mold-carrier is shown of trough-shape with its top $d$ flat to receive one of the mold-parts, and vertical sides $d'$ fitted to the body of a guide, which has a stationary longitudinal bar $f$ with posts $f'$ at the ends and feet $f^2$ secured to the top of the base.

The guide and the carrier are shown in their working position in Fig. 9 and extend across the tops of the rams $b'$, as shown in Fig. 1.

A bearing-plate $g$ is attached to the bottom of the carrier and the rams $b'$ press or bear upon such plate in lifting the carrier. In Figs. 1, 2, and 3, hydraulic reversing pistons $e$ are provided to return the mold-carrier to its lower position after each molding operation, to recharge the mold and to retract the rams $b'$.

These pistons are stationary, being attached to the base, and the reversing cylinders $h$ in which they operate are attached to the carrier, as shown in Fig. 3, and pipes $c$ connect them continuously to the hydraulic accumulator, by a passage $e'$ leading through the piston-rod $e^2$ to the pipe $c$. The pressure thus operates continuously upon these pistons, but is overcome by the greater pressure of the rams during the molding operation. When the pressure is discharged beneath the rams to open the mold, the pressure on these reversing pistons forces the carrier downward and returns the rams to their initial position.

Figs. 5 to 9 show an alternative arrangement of the reversing device having a single reversing cylinder $h'$ fastened in the middle of the stationary cross-bar $f$, and its piston $e'$ attached to the head of the carrier $d$ and operating to pull the carrier downward to the cross-bar after each actuation of the molds.

The continuous supply of the pressing fluid to these reversing pistons enables them to act automatically in returning the carrier to its initial position.

The mold-cope or top is supported rotatably upon the head $p$, having journals $j$ fitted to bearings $k$ upon the upper ends of swinging-arms $l$. The lower ends of these arms are pivoted upon bosses $m$ projected at the ends of the base, and their upper ends are tied together by a tie-bar $l'$ so that they move in unison. Hydraulic means is provided to swing the arms, and a stud $o$ is shown in Fig. 2 projected from one of the arms to contact with stationary stops $n$ and $n'$ to limit the movement. The lower mold-part $r$ is secured upon a packing-block $d''$ upon the top $d$ of the mold-carrier, and the mold-top or cope $s$ is attached to a packing-block $g'$ upon the heating and cooling-plate $s'$ secured to the bottom of the head $p$.

The arms $l$ are oscillated, as required, by two differential hydraulic pistons $w$ and $w'$, shown in Fig. 14, fitted to cylinders $v^3$ and $v^4$ attached to a bracket $m'$ which is bolted to the outer end of one of the stationary bosses $m$.

The actions of these pistons are opposed to one another like the pistons $b'$ and $e$. These pistons are connected by a yoke $w^2$ having a slot $x^4$ in which a sliding box $x'$ is movable, and is fitted to a pin or stud $v^2$ upon the side of the arm $l$. A constant hydraulic pressure is exerted upon the smaller piston $w'$ and operates, when the piston $w$ is not energized, to hold the arm $l$ upright against the stop $n'$. (See Fig. 2).

When the larger piston $w$ is energized it overcomes the force of the smaller piston, and tips the arm as shown in Fig. 2 against the stop $n$. These opposite movements are effected entirely by one valve which controls the movement of the piston $w$. The pistons $b'$ and $e$ also operate conjointly by the control of a single valve.

Figs. 1 and 3 show the head $p$ standing directly over the mold-carrier, in condition for molding an article in the mold-parts, and such position requires the arm $l$ to set in a vertical position, as in Fig. 1.

The tipping of the arms to an oblique position moves the cope $s$ to one side of the mold-bottom, to fully expose the same, as shown in Fig. 2, and the head $p$ is simultaneously rotated about 90 degrees so as to fully expose the under side of the cope. Both mold-parts are thus entirely accessible for cleaning, filling and emptying.

The rotation of the head $p$ is, in the present invention, effected by a rotator link $t$ having its upper end jointed to a lower corner of the head, and its lower end jointed to a pivot $t'$ upon one side of the base.

These parts are so arranged that the link automatically rotates the head and tips its bottom upwardly, as shown in Fig. 2, when the arms are tipped sidewise.

It has been common heretofore where the mold-parts are movable, as in the present invention, to connect a heating-plate upon one of such parts by flexible hose with the pipes supplying hot or cold fluid. Such hose is liable to wear and abrasion and obstructs free access to the mold-parts.

I have therefore devised a system of supply-pipes which are connected to the several movable parts of the machine at their centers of motion so that radius pipes movable with the arms may be connected to swivels at the axes of the arms and tilting-head and thus maintain a continuous connection with the heating-plate.

A swivel-fitting $x$ is connected by a pipe $v$ to supply hot or cold fluid, as may be required. A swivel $x'$ adjacent to the swivel $x$ is connected with a pipe $u^3$ to discharge the waste fluid from the heating-plate.

A radius-pipe $u$ extends from the swivel $x$ to a swivel connection $x^2$ upon the center of one of the journals $j$ of the head $p$. From the swivel $x^2$ a pipe $u'$ extends to the heating and cooling-plate $g'$ of the mold.

Circulation through such plate is secured by a pipe $u^2$ extended from the heating-plate to a swivel-fitting $z^2$ upon the center of the opposite journal $j$.

The pipe $u^3$ connected to this fitting by a swivel is mounted upon the tie-bar $l'$, and therefore moves with the arms $l$ and head $p$; the pipe $u^3$ being connected to the swivel $x'$ and serving to discharge the fluid in all positions of the arms and head.

It will be understood that the single piston $e'$ shown in Figs. 6 and 9 is attached to the movable mold-carrier, while the cylinder $h'$ is attached to the stationary guide-bar $f$, as shown in Fig. 7, the operation being the same, to reverse the mold-carrier after each pressing movement. In this case the pipe $c'$ is connected to the cylinder $h'$.

From the above description it will be seen that the movements of all the parts are effected by hydraulic agency, and the use of complex gearing is thus wholly avoided.

Ejector-rods $y$ are shown at two points in Fig. 1 under dotted spaces $y'$ in the top of the mold-bottom $r$, operating to eject disks $c'$ from such spaces when the mold is lowered by the action of the hydraulic piston $e^2$. Such ejections of the mold-pieces greatly facilitate their removal when the cope $s$ is turned away from the mold-bottom.

These rods are fitted loosely through holes in the mold-carrier $d$ the packing-piece $d'$ resting upon it, and also through the mold-bottom $r$, which is supported upon the packing-piece.

Such ejectors may be applied at any points in the mold-carrier corresponding with the disposition of the mold-recesses or cavities in the mold-bottom $r$.

The packing-piece $d'$ is made changeable, to accommodate molds of varying thickness in the press.

In Fig. 1, the mold-carrier $d$ and packing-block $d'$ are held from displacement upon one another by a transverse rib and groove $r'$, and a similar rib and groove connect the packing-plate $g'$ with the heating and cooling-plate $s'$. These ribs hold the parts rigidly in their adjusted positions and keep the mold-parts in exact alinement.

The use of two hydraulic plungers $b'$ to lift the mold-carrier enables the press to operate upon large mold-parts, as five feet long and twenty inches wide, but one plunger will suffice for a smaller mold-carrier.

Having thus set forth the nature of the invention what is claimed herein is:

1. A molding-press having a stationary base with upwardly movable ram thereon, vertical guides on opposite ends of the base, a mold-carrier movable upon the said guides, and resting normally upon the ram, swinging-arms jointed upon the base, a tilting-head pivoted upon the said arms, and a rod jointed to the base, and to one side of the head, and operating automatically to tilt the head when the arms are tipped.

2. A molding-press constructed as described in claim 1 and having the rod adjustable lengthwise, to vary the tilting of the head.

3. A molding-press having a stationary base with upwardly movable ram thereon, vertical guides on the base with a mold-carrier guided thereby and moved by the said ram, swinging-arms jointed upon the base, a tilting-head pivoted upon the said arms, cooperative mold-parts attached to the carrier and the head, a hydraulic cylinder mounted upon the bed at the side of one arm, with piston engaged to the said arm to tip the arm, and a connection between the said arms to move them both simultaneously.

4. A molding-press having a stationary base with upwardly movable ram thereon, a guide-bar extended transversely above the ram, and having vertical posts at the ends with feet attached to the base, a mold-carrier movable with the ram and having a trough-shaped body fitted movably to the guide-bar and its posts, a tilting-head sustained above the carrier, and cooperative mold-parts fitted to the said head and carrier.

5. A molding press having a stationary base with one or more stationary hydraulic cylinders having rams therein, guides upon the base with a mold-carrier movable thereon, bosses on the ends of the base with swinging arms jointed thereon, a tilting-head carried by the arms, mold-parts attached to the said carrier and heads, a bracket attached to one of the bosses outside of the arm which is jointed thereon, a hydraulic cylinder mounted on the bracket at the side of the said arm, and a piston in the cylinder having a sliding connection to the arm to oscillate it as described.

6. A molding press having a stationary base with one or more stationary hydraulic cylinders having rams therein, guides upon the base with a mold-carrier movable thereon, bosses on the ends of the base with swinging arms jointed thereon, a tilting-head carried by the arms, mold-parts attached to the said carrier and head, and two hydraulic reversing cylinders supported upon the base, with pistons oppositely connected to the arm to oscillate or tip the same, the pistons having different diameters, the larger one operated to tip the arm, and the smaller one to hold the arm firmly in the position for operating the molds.

7. A molding press having a stationary base with one or more stationary hydraulic cylinders each having a ram therein, guides upon the base with a mold-carrier movable thereon, bosses on the ends of the base with swinging-arms jointed thereon, a tilting-head carried by the arms, mold-parts attached to the said carrier and heads, two hydraulic reversing cylinders with connections for tipping the arm in opposite directions, and stops to limit the movement of the arm in both directions.

8. A molding-press having a part movable in contrary directions, and two opposed hydraulic cylinders and pistons of larger and smaller diameter respectively, operating oppositely at the same time upon the said part, and contrary movements of the said part being effected wholly by regulating the supply and discharge of fluid under pressure to and from the larger cylinder.

9. A molding press having a base provided with a movable ram, vertical guides upon the base with a mold-carrier guided thereby and moved by the said ram, swinging arms jointed upon the base, a head carried upon the arms, a heating and cooling plate upon the head, cooperative mold-parts attached to the carrier and to the heating and cooling-plate, means for swinging the arms, a radius-pipe and connections extended from the axis-joint of the arms to the said heating and cooling-plate, and a supply-pipe connected by a swivel to the radius-pipe at the axis of the arms.

10. A molding press having a base provided with a movable ram, vertical guides upon the base with a mold-carrier guided thereby and moved by the said ram, swinging-arms jointed upon the base, a tilting-head pivoted upon the said arms, a heating and cooling-plate attached to the tilting-head, cooperative mold-parts attached to the carrier and to the said plate, means for swinging the arms, a radius-pipe and connections extended from the axis-joint of the arms to the said heating and cooling-plate, a swivel-connection for the radius-pipe at the axis-joint of the arms, a swivel-connection upon the axis of the head and a pipe-connection from the said swivel to the said heating and cooling-plate, whereby the fluid may be circulated in the plate in any position of the head.

11. A molding press having a base provided with a movable ram, vertical guides upon the base with a mold-carrier guided thereby and moved by the said ram, swinging-arms jointed upon the base, a head carried upon the arms, cooperative mold-parts attached to the mold-carrier and to the tilting-head and such parts provided with a transverse rib and groove to hold them from displacement in relation to one another.

In testimony whereof I have hereunto set my hand.

CHARLES F. BURROUGHS.